US012737922B2

(12) United States Patent
Spletzer

(10) Patent No.: US 12,737,922 B2
(45) Date of Patent: Sep. 15, 2026

(54) EXTRINSIC CALIBRATION OF A VEHICLE-MOUNTED SENSOR USING NATURAL VEHICLE FEATURES

(71) Applicant: Seegrid Corporation, Pittsburgh, PA (US)

(72) Inventor: John Spletzer, Nokomis, FL (US)

(73) Assignee: SEEGRID CORPORATION, Pittsburgh, PA (US)

( * ) Notice: Subject to any disclaimer, the term of this patent is extended or adjusted under 35 U.S.C. 154(b) by 0 days.

(21) Appl. No.: 18/848,565

(22) PCT Filed: Mar. 28, 2023

(86) PCT No.: PCT/US2023/016589
§ 371 (c)(1),
(2) Date: Sep. 19, 2024

(87) PCT Pub. No.: WO2023/192295
PCT Pub. Date: Oct. 5, 2023

(65) Prior Publication Data

US 2025/0218039 A1 Jul. 3, 2025

Related U.S. Application Data

(60) Provisional application No. 63/324,187, filed on Mar. 28, 2022.

(51) Int. Cl.
*G06T 7/80* (2017.01)
*G01S 17/89* (2020.01)
(Continued)

(52) U.S. Cl.
CPC ................ *G06T 7/80* (2017.01); *G01S 17/89* (2013.01); *G06T 7/70* (2017.01); *G06T 19/20* (2013.01);
(Continued)

(58) Field of Classification Search
CPC .. G06T 7/80; G06T 7/70; G06T 19/20; G06T 2207/30244; G06T 2219/2016; G06V 20/56; G01S 17/89
See application file for complete search history.

(56) References Cited

U.S. PATENT DOCUMENTS 5,850,254 A 12/1998 Takano et al.
2020/0150677 A1 5/2020 Walters et al.
(Continued)

FOREIGN PATENT DOCUMENTS

WO 2021076569 4/2021

OTHER PUBLICATIONS

International Search Report and Written Opinion dated Jun. 14, 2023 issued in International Application No. PCT/US2023/016589.
(Continued)

*Primary Examiner* — Yassin Alata
(74) *Attorney, Agent, or Firm* — Onello & Mello PC

(57) ABSTRACT

In accordance with one aspect of the inventive concepts, provided is an autonomous mobile robot, comprising: at least one processor in communication with at least one computer memory device: at least one vehicle-mounted sensor configured to acquire measurement data of at least one feature of the robot; and an extrinsic calibration system comprising computer program code executable by the at least one processor to register the measurement data to a common coordinate frame to perform extrinsic calibration of the at least one sensor. The measurement data can comprise point cloud data.

21 Claims, 9 Drawing Sheets

(51) Int. Cl.
*G06T 7/70* (2017.01)
*G06T 19/20* (2011.01)
*G06V 20/56* (2022.01)

(52) U.S. Cl.
CPC .... *G06V 20/56* (2022.01); *G06T 2207/30244* (2013.01); *G06T 2219/2016* (2013.01)

(56) References Cited

U.S. PATENT DOCUMENTS

2020/0264625 A1* 8/2020 Estep .................... G05D 1/0246
2023/0348237 A1* 11/2023 Herat ...................... G01C 25/00

OTHER PUBLICATIONS

Extended European Search Report dated Nov. 27, 2025 issued in European Application No. 23781699.6.
Zaiter et al. "Extrinsic LiDAR/Ground Calibration Method Using 3D Geometrical Plane-Based Estimation", Sensors, vol. 20, No. 10, May 16, 2020, p. 2841, XP093015146, DOI: 10.3390/s20102841.

* cited by examiner

600 sensor_nominal frame $Z_{SN}$ $Y_{SN}$ $X_{SN}$ $Z_S$ $Y_S$

601

$X_S$ sensor frame

602

$Z_W$ work frame $Z_V$ $X_W$ $Y_V$

603

$X_C$ $Y_W$ $X_V$

604

605

$Y_C$ vehicle frame calibration frame

700

EXTRINSIC CALIBRATION OF A VEHICLE-MOUNTED SENSOR USING NATURAL VEHICLE FEATURES

CROSS REFERENCE TO RELATED APPLICATIONS

This application claims priority to a provisional application entitled, Extrinsic Calibration of a Vehicle-Mounted Sensor Using Natural Vehicle Features and having provisional application No. 63/324,187, filed Mar. 28, 2022, which is hereby incorporated by reference in its entirety.

The present application may be related to US Provisional Appl. 63/430,184 filed on Dec. 5, 2022, entitled Just in Time Destination Definition and Route Planning; U.S. Provisional Appl. 63/430,190 filed on Dec. 5, 2022, entitled Configuring a System that Handles Uncertainty with Human and Logic Collaboration in a Material Flow Automation Solution; U.S. Provisional Appl. 63/430,182 filed on Dec. 5, 2022, entitled Composable Patterns of Material Flow Logic for the Automation of Movement; U.S. Provisional Appl. 63/430,174 filed on Dec. 5, 2022, entitled Process Centric User Configurable Step Framework for Composing Material Flow Automation; US Provisional Appl. 63/430,195 filed on Dec. 5, 2022, entitled Generation of "Plain Language" Descriptions Summary of Automation Logic; U.S. Provisional Appl. 63/430,171 filed on Dec. 5, 2022, entitled Hybrid Autonomous System Enabling and Tracking Human Integration into Automated Material Flow; US Provisional Appl. 63/430,180 filed on Dec. 5, 2022, entitled A System for Process Flow Templating and Duplication of Tasks Within Material Flow Automation; U.S. Provisional Appl. 63/430, 200 filed on Dec. 5, 2022, entitled A Method for Abstracting Integrations Between Industrial Controls and Autonomous Mobile Robots (AMRs); and U.S. Provisional Appl. 63/430, 170 filed on Dec. 5, 2022, entitled Visualization of Physical Space Robot Queuing Areas as Non Work Locations for Robotic Operations, each of which is incorporated herein by reference in its entirety.

The present application may be related to U.S. Provisional Appl. 63/348,520 filed on Jun. 3, 2022, entitled System and Method for Generating Complex Runtime Path Networks from Incomplete Demonstration of Trained Activities; U.S. Provisional Appl. 63/410,355 filed on Sep. 27, 2022, entitled Dynamic, Deadlock-Free Hierarchical Spatial Mutexes Based on a Graph Network; U.S. Provisional Appl. 63/346, 483 filed on May 27, 2022, entitled System and Method for Performing Interactions with Physical Objects Based on Fusion of Multiple Sensors; and U.S. Provisional Appl. 63/348,542 filed on Jun. 3, 2022, entitled Lane Grid Setup for Autonomous Mobile Robots (AMRs); U.S. Provisional Appl. 63/423,679, filed Nov. 8, 2022, entitled System and Method for Definition of a Zone of Dynamic Behavior with a Continuum of Possible Actions and Structural Locations within Same; U.S. Provisional Appl. 63/423,683, filed Nov. 8, 2022, entitled System and Method for Optimized Traffic Flow Through Intersections with Conditional Convoying Based on Path Network Analysis; U.S. Provisional Appl. 63/423,538, filed Nov. 8, 2022, entitled Method for Calibrating Planar Light-Curtain; each of which is incorporated herein by reference in its entirety.

The present application may be related to US Provisional Appl. 63/324,182 filed on Mar. 28, 2022, entitled A Hybrid, Context-Aware Localization System For Ground Vehicles; U.S. Provisional Appl. 63/324,184 filed on Mar. 28, 2022, entitled Safety Field Switching Based On End Effector Conditions; US Provisional Appl. 63/324,185 filed on Mar. 28, 2022, entitled Dense Data Registration From a Vehicle Mounted Sensor Via Existing Actuator; US Provisional Appl. 63/324,188 filed on Mar. 28, 2022, entitled Continuous And Discrete Estimation Of Payload Engagement Disengagement Sensing; US Provisional Appl. 63/324,190 filed on Mar. 28, 2022, entitled Passively Actuated Sensor Deployment; U.S. Provisional Appl. 63/324,192 filed on Mar. 28, 2022, entitled Automated Identification Of Potential Obstructions In A Targeted Drop Zone; US Provisional Appl. 63/324,193 filed on Mar. 28, 2022, entitled Localization Of Horizontal Infrastructure Using Point Clouds; US Provisional Appl. 63/324,195 filed on Mar. 28, 2022, entitled Navigation Through Fusion of Multiple Localization Mechanisms and Fluid Transition Between Multiple Navigation Methods; US Provisional Appl. 63/324,198 filed on Mar. 28, 2022, entitled Segmentation Of Detected Objects Into Obstructions And Allowed Objects; US Provisional Appl. 62/324,199 filed on Mar. 28, 2022, entitled Validating The Pose Of An AMR That Allows It To Interact With An Object; and U.S. Provisional Appl. 63/324,201 filed on Mar. 28, 2022, entitled A System For AMRs That Leverages Priors When Localizing Industrial Infrastructure; each of which is incorporated herein by reference in its entirety.

The present application may be related to U.S. patent application Ser. No. 11/350,195, filed on Feb. 8, 2006, U.S. Pat. No. 7,446,766, Issued on Nov. 4, 2008, entitled Multidimensional Evidence Grids and System and Methods for Applying Same; U.S. patent application Ser. No. 12/263,983 filed on Nov. 3, 2008, U.S. Pat. No. 8,427,472, Issued on Apr. 23, 2013, entitled Multidimensional Evidence Grids and System and Methods for Applying Same; U.S. patent application Ser. No. 11/760,859, filed on Jun. 11, 2007, U.S. Pat. No. 7,880,637, Issued on Feb. 1, 2011, entitled Low-Profile Signal Device and Method For Providing Color-Coded Signals; U.S. patent application Ser. No. 12/361,300 filed on Jan. 28, 2009, U.S. Pat. No. 8,892,256, Issued on Nov. 18, 2014, entitled Methods For Real-Time and Near-Real Time Interactions With Robots That Service A Facility; U.S. patent application Ser. No. 12/361,441, filed on Jan. 28, 2009, U.S. Pat. No. 8,838,268, Issued on Sep. 16, 2014, entitled Service Robot And Method Of Operating Same; U.S. patent application Ser. No. 14/487,860, filed on Sep. 16, 2014, U.S. Pat. No. 9,603,499, Issued on Mar. 28, 2017, entitled Service Robot And Method Of Operating Same; U.S. patent application Ser. No. 12/361,379, filed on Jan. 28, 2009, U.S. Pat. No. 8,433,442, Issued on Apr. 30, 2013, entitled Methods For Repurposing Temporal-Spatial Information Collected By Service Robots; U.S. patent application Ser. No. 12/371,281, filed on Feb. 13, 2009, U.S. Pat. No. 8,755,936, Issued on Jun. 17, 2014, entitled Distributed Multi-Robot System; U.S. patent application Ser. No. 12/542,279, filed on Aug. 17, 2009, U.S. Pat. No. 8,169,596, Issued on May 1, 2012, entitled System And Method Using A Multi-Plane Curtain; U.S. patent application Ser. No. 13/460,096, filed on Apr. 30, 2012, U.S. Pat. No. 9,310,608, Issued on Apr. 12, 2016, entitled System And Method Using A Multi-Plane Curtain; U.S. patent application Ser. No. 15/096,748, filed on Apr. 12, 2016, U.S. Pat. No. 9,910,137, Issued on Mar. 6, 2018, entitled System and Method Using A Multi-Plane Curtain; U.S. patent application Ser. No. 13/530,876, filed on Jun. 22, 2012, U.S. Pat. No. 8,892,241, Issued on Nov. 18, 2014, entitled Robot-Enabled Case Picking; U.S. patent application Ser. No. 14/543,241, filed on Nov. 17, 2014, U.S. Pat. No. 9,592,961, Issued on Mar. 14, 2017, entitled Robot-Enabled Case Picking; U.S. patent application Ser. No. 13/168,639, filed on Jun. 24, 2011, U.S.

Pat. No. 8,864,164, Issued on Oct. 21, 2014, entitled Tugger Attachment; US Design patent application 29/398,127, filed on Jul. 26, 2011, U.S. Pat. No. D680,142, Issued on Apr. 16, 2013, entitled Multi-Camera Head; US Design patent application Ser. No. 29/471,328, filed on Oct. 30, 2013, U.S. Pat. No. D730,847, Issued on Jun. 2, 2015, entitled Vehicle Interface Module; U.S. patent application Ser. No. 14/196,147, filed on Mar. 4, 2014, U.S. Pat. No. 9,965,856, Issued on May 8, 2018, entitled Ranging Cameras Using A Common Substrate; U.S. patent application Ser. No. 16/103,389, filed on Aug. 14, 2018, U.S. Pat. No. 11,292,498, Issued on Apr. 5, 2022, entitled Laterally Operating Payload Handling Device; U.S. patent application Ser. No. 16/892,549, filed on Jun. 4, 2020, US Publication Number 2020/0387154, Published on Dec. 10, 2020, entitled Dynamic Allocation And Coordination of Auto-Navigating Vehicles and Selectors; U.S. patent application Ser. No. 17/163,973, filed on Feb. 1, 2021, US Publication Number 2021/0237596, Published on Aug. 5, 2021, entitled Vehicle Auto-Charging System and Method; U.S. patent application Ser. No. 17/197,516, filed on Mar. 10, 2021, US Publication Number 2021/0284198, Published on Sep. 16, 2021, entitled Self-Driving Vehicle Path Adaptation System and Method; U.S. patent application Ser. No. 17/490,345, filed on Sep. 30, 2021, US Publication Number 2022-0100195, published on Mar. 31, 2022, entitled Vehicle Object-Engagement Scanning System And Method; U.S. patent application Ser. No. 17/478,338, filed on Sep. 17, 2021, US Publication Number 2022-0088980, published on Mar. 24, 2022, entitled Mechanically-Adaptable Hitch Guide each of which is incorporated herein by reference in its entirety.

FIELD OF INTEREST

The present inventive concepts relate to systems and methods in the field of robotic vehicles and/or autonomous mobile robots (AMRs). Aspects of the inventive concepts are applicable to any mobile robotics application. More specifically, the present inventive concepts relate to systems and methods of extrinsic calibration of a vehicle-mounted sensor using natural vehicle features.

BACKGROUND

Robot vehicles use exteroceptive sensing to build models of objects and their environment. To effectively interface with these models, measurements from vehicle mounted sensors must be accurately registered to a reference or common vehicle frame. This is accomplished by determining a rigid transformation, e.g., translation and rotation, between the sensor frame and the common vehicle frame, and then applying this transformation to measurements in the sensor frame. The process of estimating this transformation is known as extrinsic calibration. When operating in unconstrained 3-dimensional "3D" worlds, a six (6) degree-of-freedom (DOF) calibration (i.e., tx, ty, tz, roll, pitch, yaw) is required corresponding to changes in position (tx, ty, tz) and orientation (roll, pitch, yaw) of the x, y, and z axes, respectively.

Extrinsic calibration is necessary for autonomous mobile robots (AMRs) to interact with the environment so that all measurements can be registered to a common vehicle coordinate frame, or work frame. For example, multiple light detection, and ranging (LiDAR) sensors and/or 3D cameras can be mapped to a vehicle coordinate system. This allows safe and reliable navigation in cluttered environments, as well as object manipulation and interfacing with infrastructure.

Currently, one approach for extrinsic calibration is using "CAD" measurements that provide an estimate. However, inaccuracies in the dimensions, manufacturing tolerances, etc., make this solution unacceptable except for tasks requiring the lowest levels of accuracy.

SUMMARY OF THE INVENTION

In accordance with one aspect of the inventive concepts, provided is a robotic vehicle, comprising: at least one processor in communication with at least one computer memory device; at least one vehicle-mounted sensor configured to acquire measurement data of at least one natural feature of the robotic vehicle; and an extrinsic calibration system comprising computer program code executable by the at least one processor to register the measurement data to a common coordinate frame to perform an extrinsic calibration of the at least one sensor.

In various embodiments, the measurement data includes point cloud data.

In various embodiments, the at least one processor is configured to perform the extrinsic calibration of the at least one sensor based on the point cloud data.

In various embodiments, the at least one sensor comprises at least one of a LiDAR scanner and a 3D camera.

In various embodiments, the at least one sensor comprises a static sensor and the extrinsic calibration is provided based on a single measurement from the static sensor.

In various embodiments, the at least one sensor comprises an actuated sensor and the extrinsic calibration is provided based on multiple measurements from the actuated sensor.

In various embodiments, the at least one natural feature is a pair of outriggers within a line-of-sight of the at least one sensor, the outriggers having a color providing a reflective surface for receiving a source of laser light that illuminates the outriggers, and the at least one sensor measures a reflection of the laser light received from the outriggers.

In various embodiments, the extrinsic calibration system segments a 3D model of the outriggers from the at least one sensor to a point cloud and corrects a translation and rotation of a three-dimensional model of the outriggers with a point set of the point cloud.

In various embodiments, the at least one natural feature is a floor on which the robotic vehicle operates, wherein the extrinsic calibration system segments a 3D model from the at least one sensor to a point cloud and corrects a translation and rotation of a plane model of the floor with a point set of the point cloud.

In various embodiments, the extrinsic calibration system recovers an actual position and orientation of the at least one sensor in a vehicle frame.

In various embodiments, the extrinsic calibration system corrects a nominal calibration of the at least one sensor by generating a first transform between a work frame and a calibration frame and a second transform between the initial sensor coordinate frame and a sensor frame.

In accordance with another aspect of the inventive concepts, provided is a method of providing an extrinsic calibration of a mounted sensor on an autonomous mobile robot, comprising at least one vehicle-mounted sensor acquiring measurement data of at least one feature of the robot; and an extrinsic calibration system processing the measurement data, including registering the measurement data to a common coordinate frame to perform extrinsic calibration of the at least one sensor.

In various embodiments, the measurement data includes point cloud data.

In various embodiments, performing the extrinsic calibration of the at least one sensor is based at least in part on the point cloud data.

In various embodiments, the extrinsic calibration comprises acquiring the point cloud data from the at least one sensor; detecting natural features of the robot; automatically estimating the relative position and orientation of the natural features from the sensor measurements; mapping the relative position and orientation of the natural features to errors in sensor calibration; and determining the extrinsic calibration that minimizes the errors.

In various embodiments, the at least one sensor comprises a static sensor and the extrinsic calibration is based on a single measurement from the static sensor.

In various embodiments, the at least one sensor comprises an actuated sensor and the extrinsic calibration is based on multiple measurements from the actuated sensor.

In various embodiments, the method further includes performing extrinsic calibration of the at least one sensor at regular intervals, or when certain program states are entered.

In various embodiments, the extrinsic calibration system corrects a nominal calibration of the at least one sensor by generating a first transform between a work frame and a calibration frame and a second transform between the initial sensor coordinate frame and a sensor frame.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. In the drawings.

DESCRIPTION OF PREFERRED EMBODIMENT

Figure 1A:
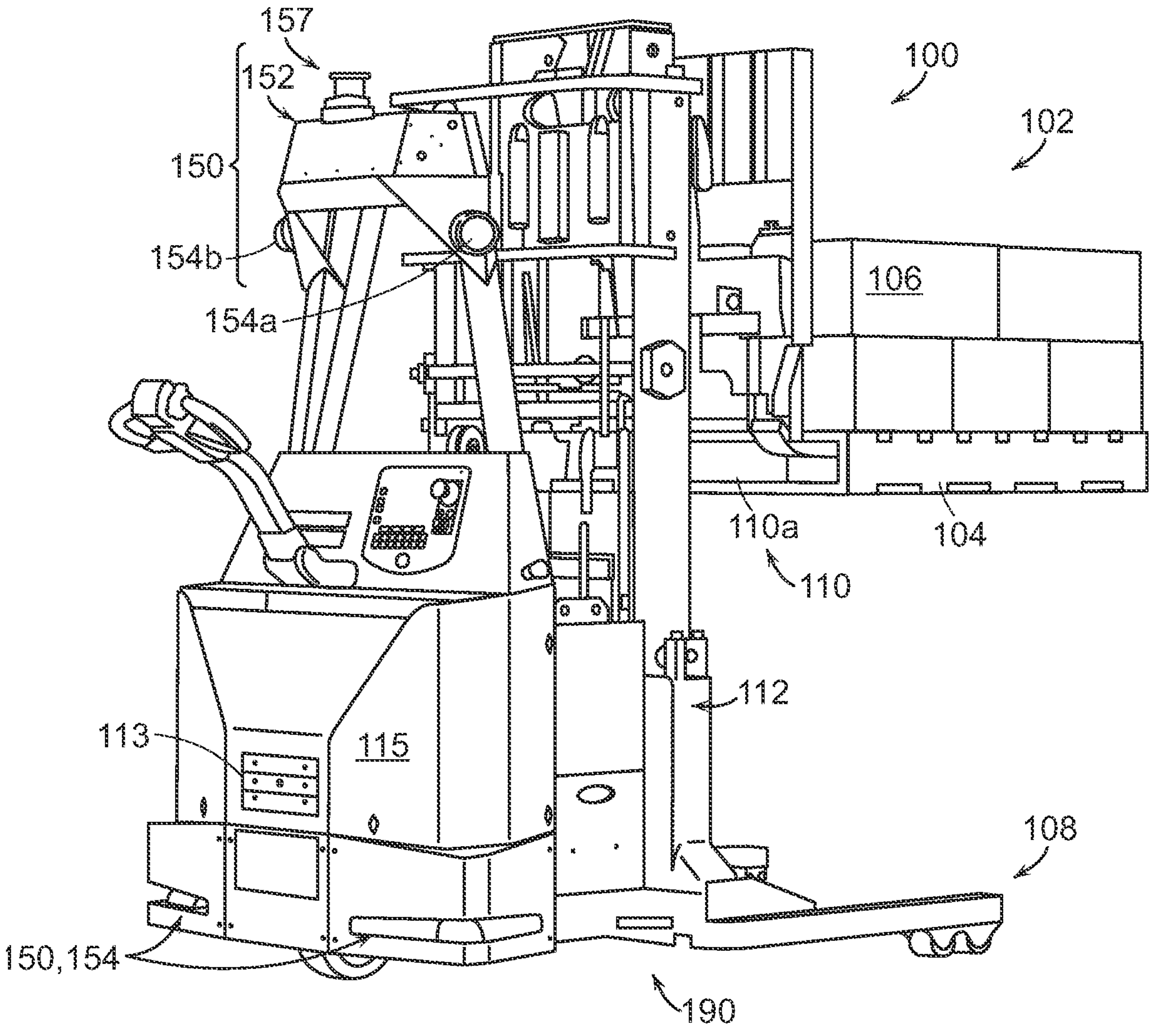
FIG. 1A provides a perspective view of a robotic vehicle in accordance with aspects of the inventive concepts.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

In the context of the inventive concepts, and unless otherwise explicitly indicated, a "real-time" action is one that occurs while the AMR is in-service and performing normal operations. This is typically in immediate response to new sensor data or triggered by some other event. The output of an operation performed in real-time will take effect upon the system so as to minimize any latency.

In brief overview, according to the present inventive concepts, an automated extrinsic calibration of a vehicle-mounted sensor is provided without the use of calibration targets. Instead of calibration targets, natural features of the vehicle itself are used to provide the extrinsic calibration. Vehicle sensors can include monocular cameras, 3D or stereo cameras, and/or LiDAR or the like as examples.

When the aspects of the inventive concepts are implemented in a properly equipped and configured AMR, whenever a sensor needs to be recalibrated, or a new sensor being installed needs to be calibrated, a user, e.g., a customer, would not need to find and use calibration targets or relocate the vehicle to any specific location in their facility. Rather, in various embodiments, if a sensor needs to be recalibrated/calibrated, the user could just provide an input, e.g., press a button onboard the vehicle, and the vehicle would recalibrate itself by observing itself. Other types of calibration initiation inputs or signals could be used in other embodiments, e.g., a user could enter a code, provide a gesture, and/or enter instructions via a graphical user interface (GUI) or other form if user interface (IU) as a method of providing the calibration initiation input or signal. In some embodiments, the calibration input or signal could be provided via a wired or wireless communication interface, e.g., via a handheld user device (e.g., a mobile phone) and/or view a management system that monitors vehicle status for one or more AMRs. In some embodiments, the robot will use this feature for health monitoring, and will be programmed to check the calibration of its sensor at a regularly scheduled interval, or when certain program states are entered. This is possible as extrinsic calibration is turned into proprioceptive observations.

In various embodiments, rather than require special external targets, jigs, or features in the environment (e.g., a warehouse environment), parts of the vehicle itself can be used as calibration targets. Vehicle parts may be fully observable from a single sensor measurement or may require multiple measurements in the case of an actuated sensor for full coverage.

According to the present inventive concepts, extrinsic calibration is accomplished by establishing a virtual "calibration" frame that is 1) convenient to the sensor's viewing area, and 2) convenient to an existing vehicle "work" frame. Features are extracted in the work frame, and pose inconsistencies are removed via a transform to the calibration frame. Features may be fully observable from a single sensor measurement or may require multiple sensors if the sensor is actuated. Once the work-to-calibration frame transform is determined, it is back propagated to the desired common vehicle sensor frame.

Figure 1B:
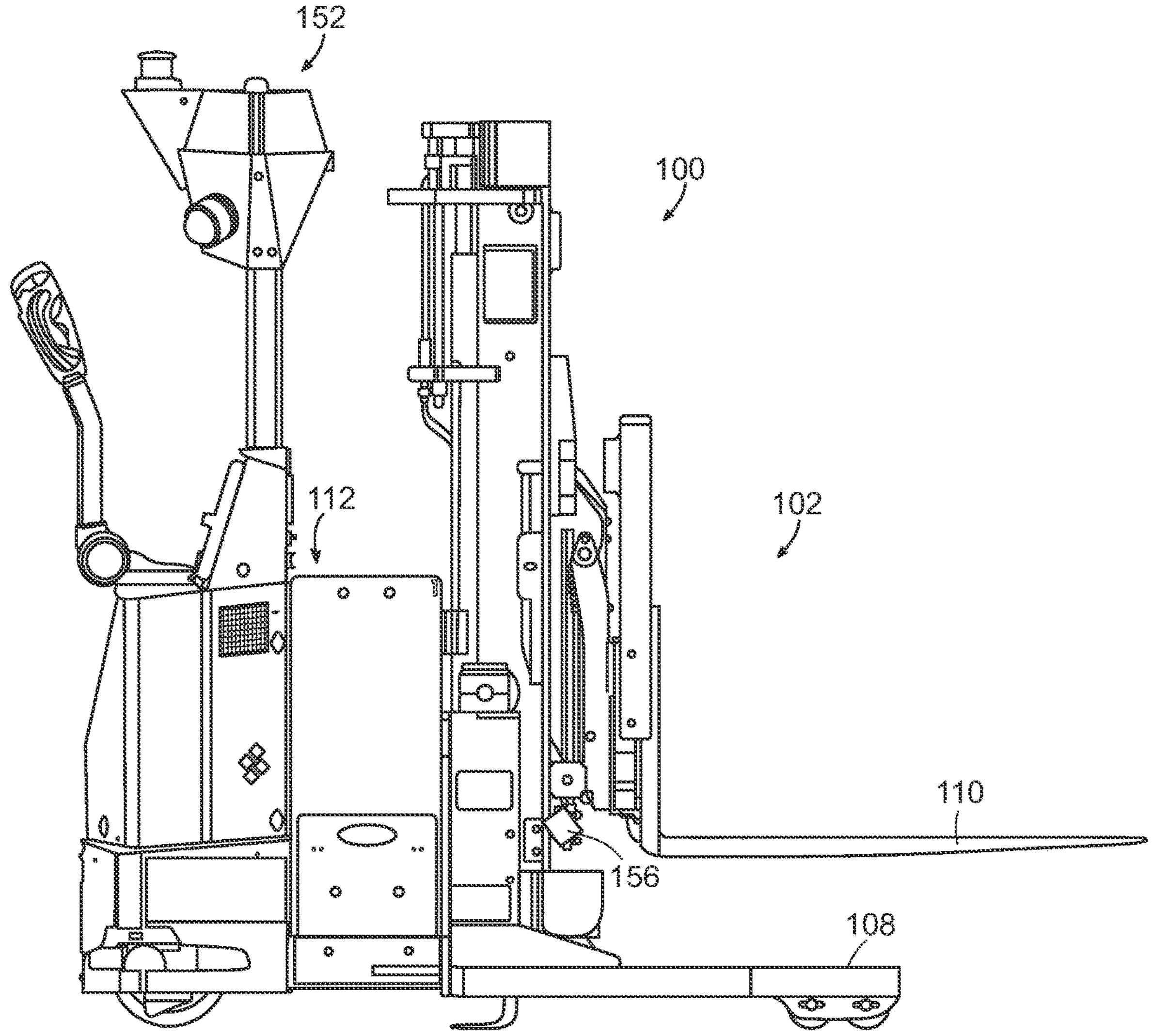
FIG. 1B provides a side view of a robotic vehicle with its load engagement portion retracted, in accordance with aspects of the inventive concepts.
Figure 1C:
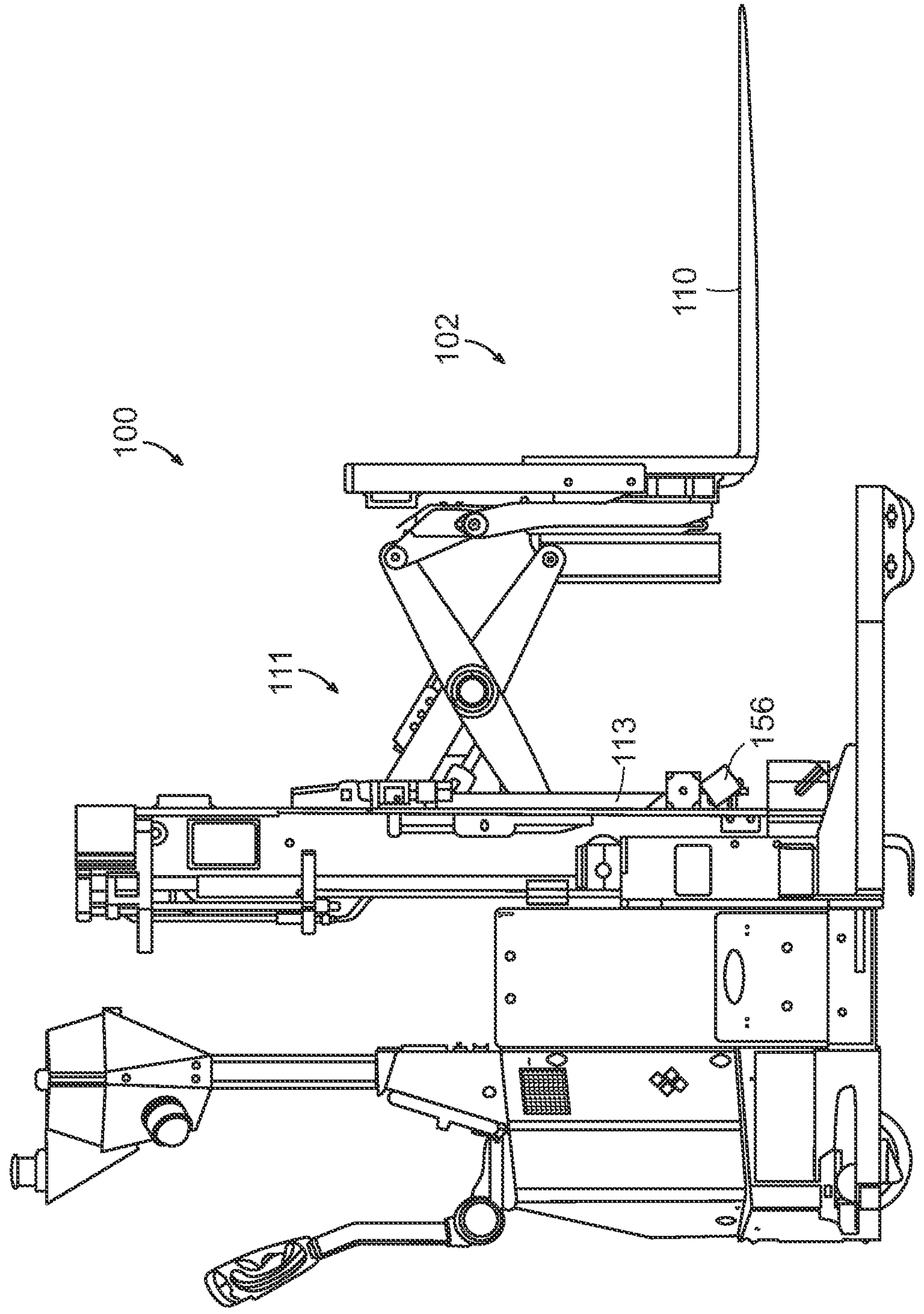
FIG. 1C provides a side view of a robotic vehicle with its load engagement portion extended, in accordance with aspects of the inventive concepts.

Referring to FIG. 1A through 1C, collectively referred to as FIG. 1, shown is an example of a self-driving or robotic vehicle 100 in the form of an AMR that can be configured with the sensing, processing, and memory devices and subsystems necessary and/or useful for performing self-calibration in accordance with aspects of the inventive concepts. The robotic vehicle 100 can take the form of an AMR lift truck, but the inventive concepts could be embodied in any of a variety of other types of robotic vehicles and AMRs, including, but not limited to, pallet trucks, tuggers, and the like.

Figure 4:
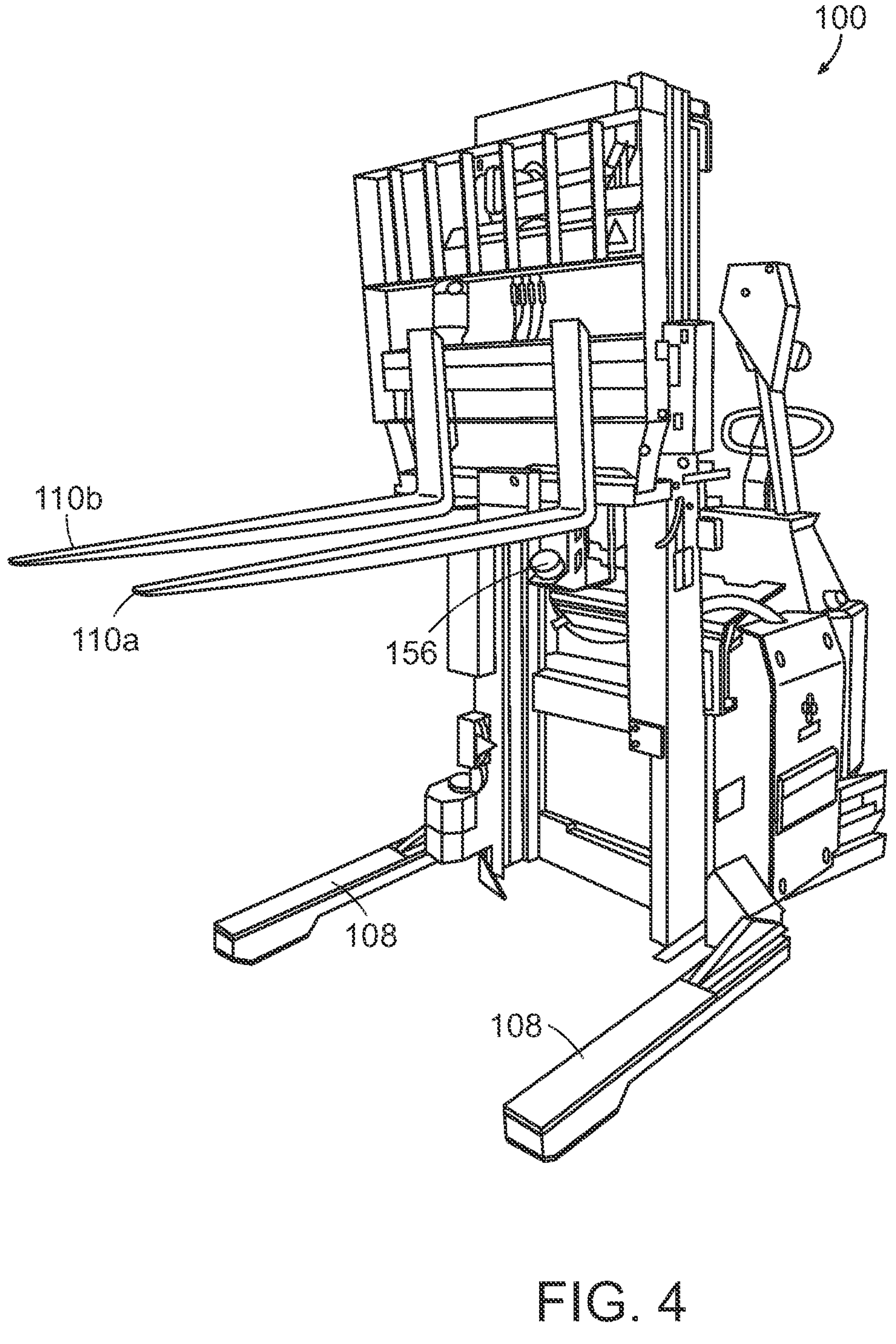
FIG. 4 is a perspective view of an AMR forklift 100 having at least one vehicle-mounted sensor that can be configured to provide extrinsic calibration of the vehicle-mounted sensor using natural vehicle features, in accordance with aspects of the inventive concepts.

In this embodiment, the robotic vehicle 100 includes a payload area 102 configured to transport a pallet 104 loaded with goods 106. To engage and carry the pallet 104, the robotic vehicle may include a pair of forks 110, and as shown in FIG. 4, includes first and second forks 110*a,b*. Outriggers 108 extend from the robotic vehicle in the direction of the forks to stabilize the vehicle, particularly when carrying the palletized load 106. The robotic vehicle 100 can comprise a battery area 112 for holding one or more batteries. In various embodiments, the one or more batteries can be configured for charging via a charging interface 113. The robotic vehicle 100 can also include a main housing 115 within which various control elements and subsystems can be disposed, including those that enable the robotic vehicle to navigate from place to place.

The forks 110 may be supported by one or more robotically controlled actuators 111 coupled to a carriage 113 that enable the robotic vehicle 100 to raise and lower, side-shift, and extend and retract to pick up and drop off loads, e.g., palletized loads 106. In various embodiments, the robotic vehicle may be configured to robotically control the yaw, pitch, and/or roll of the forks 110 to pick a palletized load in view of the pose of the load and/or horizontal surface that supports the load. In various embodiments, the robotic vehicle may be configured to robotically control the yaw, pitch, and/or roll of the forks 110 to pick a palletized load in view of the pose of the horizontal surface that is to receive the load.

The robotic vehicle 100 may include a plurality of sensors 150 that provide various forms of sensor data that enable the robotic vehicle to safely navigate throughout an environment, engage with objects to be transported, and avoid obstructions. In various embodiments, the sensor data from one or more of the sensors 150 can be used for path navigation and obstruction detection and avoidance, including avoidance of detected objects, hazards, humans, other robotic vehicles, and/or congestion during navigation.

One or more of the sensors 150 can form part of a two-dimensional (2D) or three-dimensional (3D) high-resolution imaging system used for navigation and/or object detection. In some embodiments, one or more of the sensors can be used to collect sensor data used to represent the environment and objects therein using point clouds to form a 3D evidence grid of the space, each point in the point cloud representing a probability of occupancy of a real-world object at that point in 3D space.

In computer vision and robotic vehicles, a typical task is to identify specific objects in a 3D model and to determine each object's position and orientation relative to a coordinate system. This information, which is a form of sensor data, can then be used, for example, to allow a robotic vehicle to manipulate an object or to avoid moving into the object. The combination of position and orientation is referred to as the "pose" of an object. The image data from which the pose of an object is determined can be either a single image, a stereo image pair, or an image sequence where, typically, the camera as a sensor 150 is moving with a known velocity as part of the robotic vehicle.

The sensors 150 can include one or more stereo cameras 152 and/or other volumetric sensors, sonar sensors, radars, and/or LiDAR scanners or sensors 154, as examples. Inventive concepts are not limited to particular types of sensors. In various embodiments, sensor data from one or more of the sensors 150, e.g., one or more stereo cameras 152 and/or LiDAR scanners 154 can be used to generate and/or update a 2-dimensional or 3-dimensional model or map of the environment, and sensor data from one or more of the sensors 150 can be used for the determining location of the robotic vehicle 100 within the environment relative to the electronic map of the environment. In some embodiments, calibration techniques described herein are performed on one or more 3D LiDAR or carriage sensors 156.

In the embodiment shown in FIG. 1A, there are two LiDAR devices 154*a*, 154*b* positioned at the top left and right of the robotic vehicle 100. In the embodiment shown in FIG. 1, at least one of the LiDAR devices 154*a,b* can be a 2D or 3D LiDAR device. In alternative embodiments, a different number of 2D or 3D LiDAR device are positioned near the top of the robotic vehicle 100. Also, in this embodiment a LiDAR 157 is located at the top of the mast. Some embodiments LiDAR 157 is a 2D LiDAR used for localization.

In some embodiments, the sensors 150 can include sensors configured to detect objects in the payload area and/or behind the forks 110*a,b*. The sensors can be used in combination with others of the sensors, e.g., stereo camera head 152. In some embodiments, the sensors 150 can include one or more carriage sensors 156 oriented to collected 3D sensor data of the payload area 102 and/or forks 110. The carriage sensors 156 can include a 3D camera and/or a LiDAR scanner, as examples. In some embodiments, the carriage sensors 156 can be coupled to the robotic vehicle 100 so that they move in response to movement of the actuators 111 and/or fork 110. For example, in some embodiments, the carriage sensors 156 can be mounted to the mast and/or carriage 113 so that the sensor can move in response to up and down, side-shift left and right, and/or extension and retraction movement of the forks. In some embodiments, the carriage sensors 156 collect 3D sensor data as they move with the forks 110.

Examples of stereo cameras arranged to provide 3-dimensional vision systems for a vehicle, which may operate at any of a variety of wavelengths, are described, for example, in U.S. Pat. No. 7,446,766, entitled Multidimensional Evidence Grids and System and Methods for Applying Same and U.S. Pat. No. 8,427,472, entitled Multi-Dimensional Evidence Grids, which are hereby incorporated by reference in their entirety. LiDAR systems arranged to provide light curtains, and their operation in vehicular applications, are described, for example, in U.S. Pat. No. 8,169,596, entitled System and Method Using a Multi-Plane Curtain, which is hereby incorporated by reference in its entirety.

Figure 2:
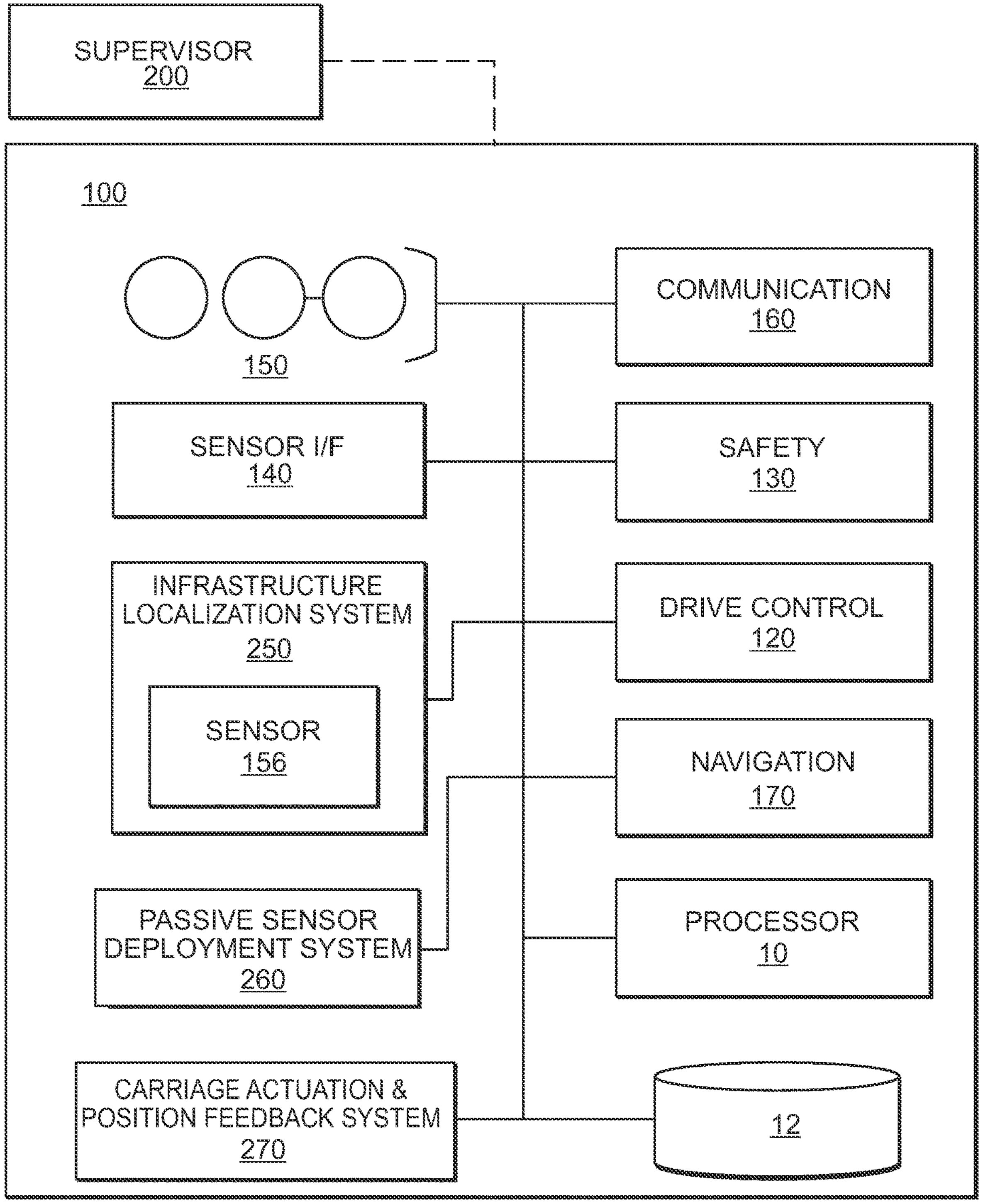
FIG. 2 is a block diagram of an embodiment of an AMR, in accordance with aspects of the inventive concepts.

FIG. 2 is a block diagram of components of an embodiment of the robotic vehicle 100 of FIG. 1, incorporating technology for automated detection and localization of horizontal infrastructures, in accordance with principles of inventive concepts. The embodiment of FIG. 2 is an example; other embodiments of the robotic vehicle 100 can include other components and/or terminology. In the example embodiment shown in FIGS. 1 and 2, the robotic vehicle 100 is a warehouse robotic vehicle, which can interface and exchange information with one or more external systems, including a supervisor system, fleet management system, and/or warehouse management system (collectively "supervisor 200"). In various embodiments, the supervisor 200 could be configured to perform, for example, fleet management and monitoring for a plurality of vehicles (e.g., AMRs) and, optionally, other assets within the environment. The supervisor 200 can be local or remote to the environment, or some combination thereof.

In various embodiments, the supervisor 200 can be configured to provide instructions and data to the robotic vehicle 100, and to monitor the navigation and activity of the robotic vehicle and, optionally, other robotic vehicles. The robotic vehicle can include a communication module 160 configured to enable communications with the supervisor 200 and/or any other external systems. The communication module 160 can include hardware, software, firmware, receivers, and transmitters that enable communication with the supervisor 200 and any other external systems over any now known or hereafter developed communication technology, such as various types of wireless technology including, but not limited to, WiFi, Bluetooth™, cellular, global positioning system (GPS), radio frequency (RF), and so on.

As an example, the supervisor 200 could wirelessly communicate a path for the robotic vehicle 100 to navigate for the vehicle to perform a task or series of tasks. The path can be relative to a map of the environment stored in memory and, optionally, updated from time-to-time, e.g., in real-time, from vehicle sensor data collected in real-time as the robotic vehicle 100 navigates and/or performs its tasks. The sensor data can include sensor data from sensors 150. As an example, in a warehouse setting the path could include a plurality of stops along a route for the picking and loading and/or the unloading of goods. The path can include a plurality of path segments. The navigation from one stop to another can comprise one or more path segments. The supervisor 200 can also monitor the robotic vehicle 100, such as to determine robotic vehicle's location within an environment, battery status and/or fuel level, and/or other operating, vehicle, performance, and/or load parameters.

In example embodiments, a path may be developed by "training" the robotic vehicle 100. That is, an operator may guide the robotic vehicle 100 through a path within the environment while the robotic vehicle, through a machine-learning process, learns and stores the path for use in task performance and builds and/or updates an electronic map of the environment as it navigates. The path may be stored for future use and may be updated, for example, to include more, less, or different locations, or to otherwise revise the path and/or path segments, as examples.

As is shown in FIG. 2, in example embodiments, the robotic vehicle 100 includes various functional elements, e.g., components and/or modules, which can be housed within the housing 115. Such functional elements can include at least one processor 10 coupled to at least one memory 12 to cooperatively operate the vehicle and execute its functions or tasks. The memory 12 can include computer program instructions, e.g., in the form of a computer program product, executable by the processor 10. The memory 12 can also store various types of data and information. Such data and information can include route data, path data, path segment data, pick data, location data, environmental data, and/or sensor data, as examples, as well as the electronic map of the environment. In some embodiments, the memory 12 stores relevant measurement data for use by the extrinsic calibration module 180 in performing a calibration operation, for example, proprioceptive data such as encoder measurements, sensor measurement, and so on.

In this embodiment, the processor 10 and memory 12 are shown onboard the robotic vehicle 100 of FIG. 1, but external (offboard) processors, memory, and/or computer program code could additionally or alternatively be provided. That is, in various embodiments, the processing and computer storage capabilities can be onboard, offboard, or some combination thereof. For example, some processor and/or memory functions could be distributed across the supervisor 200, other vehicles, and/or other systems external to the robotic vehicle 100.

The functional elements of the robotic vehicle 100 can further include a navigation module 170 configured to access environmental data, such as the electronic map, and path information stored in memory 12, as examples. The navigation module 170 can communicate instructions to a drive control subsystem 120 to cause the robotic vehicle 100 to navigate its path within the environment. During vehicle travel, the navigation module 170 may receive information from one or more sensors 150, via a sensor interface (I/F) 140, to control and adjust the navigation of the robotic vehicle. For example, the sensors 150 may provide 2D and/or 3D sensor data to the navigation module 170 and/or the drive control subsystem 120 in response to sensed objects and/or conditions in the environment to control and/or alter the robotic vehicle's navigation. As examples, the sensors 150 can be configured to collect sensor data related to objects, obstructions, equipment, goods to be picked, hazards, completion of a task, and/or presence of humans and/or other robotic vehicles. The robotic vehicle may also include a human user interface configured to receive human operator inputs, e.g., a pick or drop complete input at a stop on the path. Other human inputs could also be accommodated, such as inputting map, path, and/or configuration information.

A safety module 130 can also make use of sensor data from one or more of the sensors 150, including LiDAR scanners 154, to interrupt and/or take over control of the drive control subsystem 120 in accordance with applicable safety standard and practices, such as those recommended or dictated by the United States Occupational Safety and Health Administration (OSHA) for certain safety ratings. For example, if safety sensors detect objects in the path as a safety hazard, such sensor data can be used to cause the drive control subsystem 120 to stop the vehicle to avoid the hazard.

In various embodiments, the robotic vehicle 100 can include a payload engagement module 185. The payload engagement module 185 can process sensor data from one or more of the sensors 150, such as carriage sensors 156, and generate signals to control one or more actuators that control the engagement portion of the robotic vehicle 100. For example, the payload engagement module 185 can be configured to robotically control the actuators 111 and carriage 113 to pick and drop payloads. In some embodiments, the payload engagement module 185 can be configured to control and/or adjust position and orientation of the load engagement portion of the robotic vehicle 110, e.g., forks 110.

In example embodiments, the robotic vehicle 100 may use and/or include an extrinsic calibration module 180 that includes a system that provides an extrinsic calibration operation using at least one vehicle mounted sensor 150 without the need for calibration targets or jigs and registers it to a common vehicle coordinate frame. As shown in FIGS. 1 and 4, in various embodiments, the system can comprise a mobile robotics platform, such as an AMR, at least one sensor 150 configured to collect/acquire point cloud data, such as a LiDAR scanner or 3D camera; and at least one local processor (e.g., part of the calibration module 180 of FIG. 1) configured to process, interpret, and register the sensor data relative to a common coordinate frame. For example, scans from the sensor 154, e.g., LiDAR scanner or 3D camera, are translated and rotated in all six degrees of freedom to align to one another and create a contiguous point cloud. To do this, a transform is applied to the data. The sensor data collected by the sensors 150 can represent objects in the path using the point clouds, where points in a point cloud represent discrete samples of the positions of the objects in 3-dimensional space. The AMR 100 may respond in various ways depending upon whether a point cloud based on the sensor data includes one or more points impinging upon, falling within an envelope of, or coincident with the 3-dimensional path projection (or tunnel) of the vehicle 100.

Figure 3:
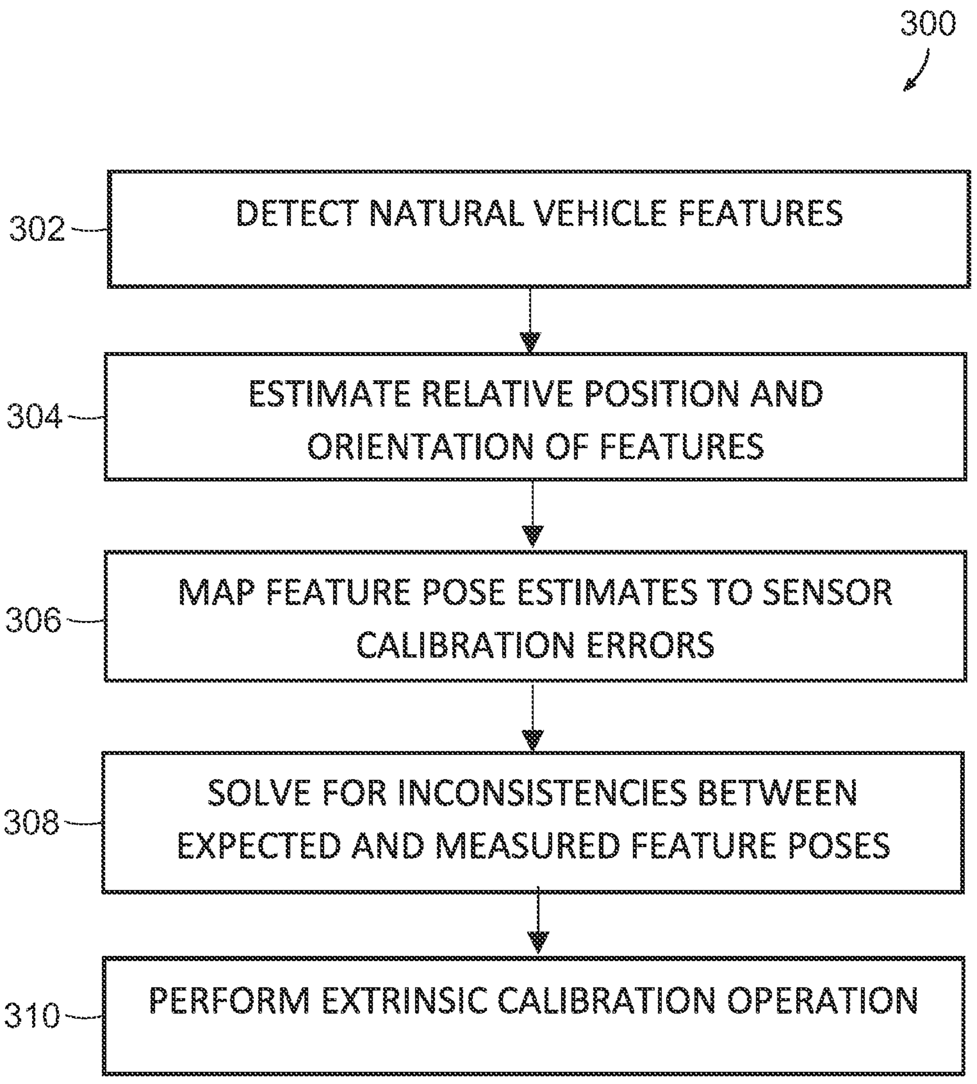
FIG. 3 is a flow diagram of an embodiment of a method for calibrating a sensor coupled to a vehicle, in accordance with aspects of the inventive concepts.

Using the extrinsic calibration module 180, FIG. 3 describes an embodiment of a method 300 for calibrating a sensor 150 coupled to a vehicle, for example, carriage sensor 156. For example, some or all of the method 300 can be executed by a combination of components of the AMR 100 to perform an extrinsic calibration of at least one vehicle mounted sensor 150, e.g., a carriage sensor 156, without calibration targets and register it to the common vehicle coordinate frame.

At step 302, one or more natural vehicle features 190 are detected by the sensor 156 being calibrated that are suitable for calibration with the sensor 156. Natural vehicle features 190 may be deemed suitable by a person or computer capable of determining where to recover at least a portion of the transform, for example, a tz-roll-pitch determined from the ground surface and tx-ty-yaw determined from the outriggers 108. In doing so, the sensor 150 acquires measurement data of at least one feature of the vehicle 100.

At step 304, the calibration module 180 automatically estimates the relative position and orientation of these features from sensor measurement data, for example, points in a point cloud and/or encoder measurements.

At step 306, the expected feature poses are determined from the estimates of the relative position and orientation and the features are mapped to errors in sensor calibration.

At step 308, the calibration module 180 solves for the extrinsic calibration to minimize the errors. For example, the calibration module 180 solves inconsistencies between expected and measured feature poses.

At step 310, the calibration module 180 performs an extrinsic calibration operation using a single measurement from the static, mounted sensor 156 and in doing so can calibrate cameras and depth measurement systems such as stereo cameras and/or LiDAR devices.

In various embodiments, the extrinsic calibration can be further determined using multiple measurements from a sensor 150, e.g., static and actuated sensors, to both provide multiple measurements for a more robust estimate, and to ensure proper feature coverage.

In various embodiments, the calibration module 180 can be implemented using Linux, ROS2, Python, and related libraries that have commercially usable licenses. In various embodiments, third-party sensors can be used.

Data may be aggregated from multiple measurements, as described in the related U.S. Provisional Patent Application No. 63/324,185 entitled "Dense Data Registration from a Vehicle Mounted Sensor Via Existing Actuator," which is incorporated herein by reference.

Figure 5:
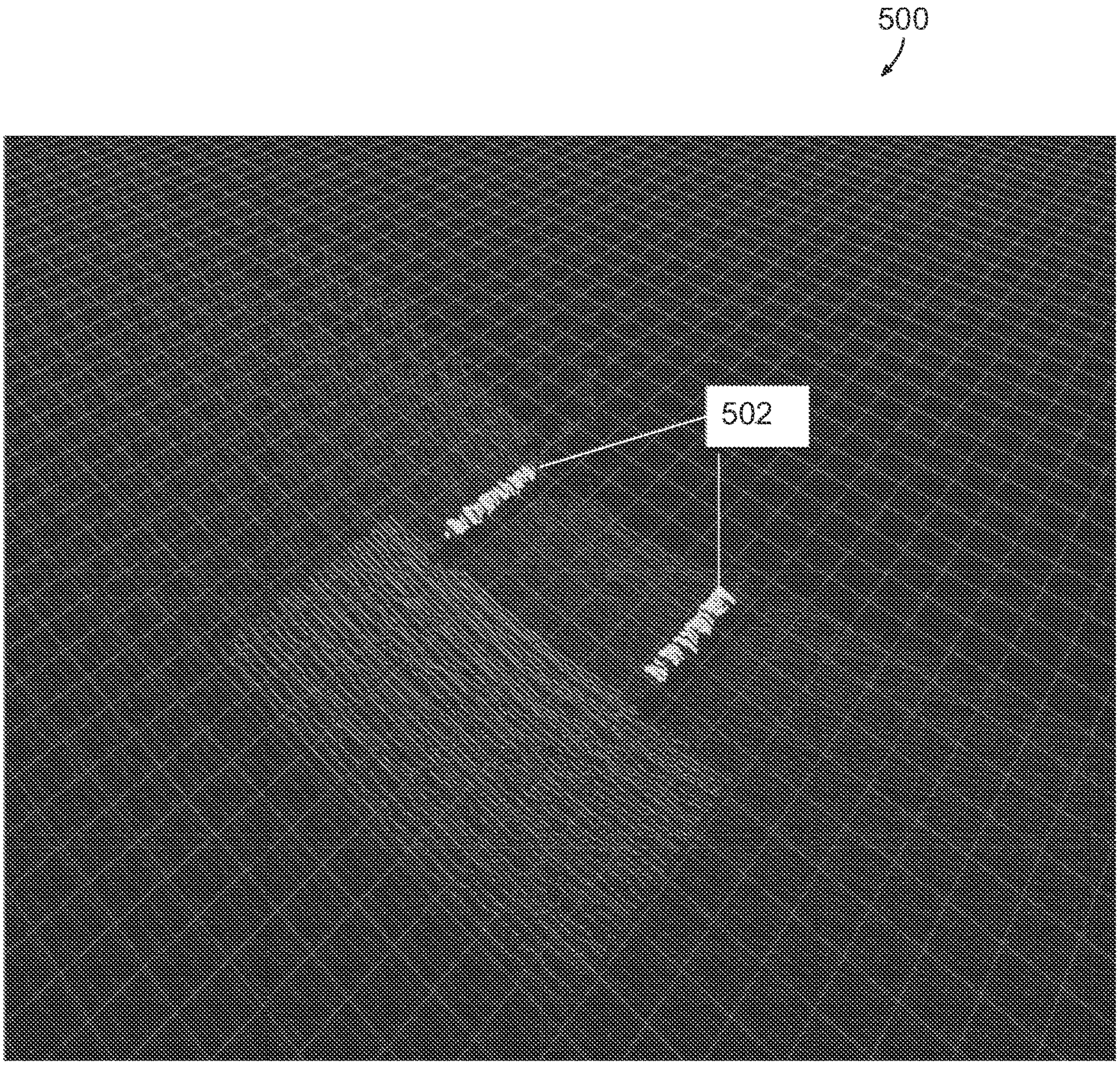
FIG. 5 is a LiDAR image taken from a vehicle-mounted sensor of the AMR forklift of FIG. 4, in accordance with aspects of the inventive concepts.

For example, shown in FIG. 5 is a point cloud 500 taken from a vehicle-mounted sensor 150 of the AMR forklift of FIG. 4, in accordance with aspects of the inventive concepts. For example, the outriggers 108 of the vehicle 100, which are part of the vehicle and used for the calibration, may be segmented to produce the image shown in FIG. 5, i.e., reflecting light from the image 502 of the outriggers 108 back to the sensor 150, and for the outriggers 108 to function as a natural feature 190 (shown in FIG. 2). The system can estimate the geometry, e.g., position and orientation, from the point set on the floor for performing a calibration operation, for example, described in embodiments herein.

Figure 6:
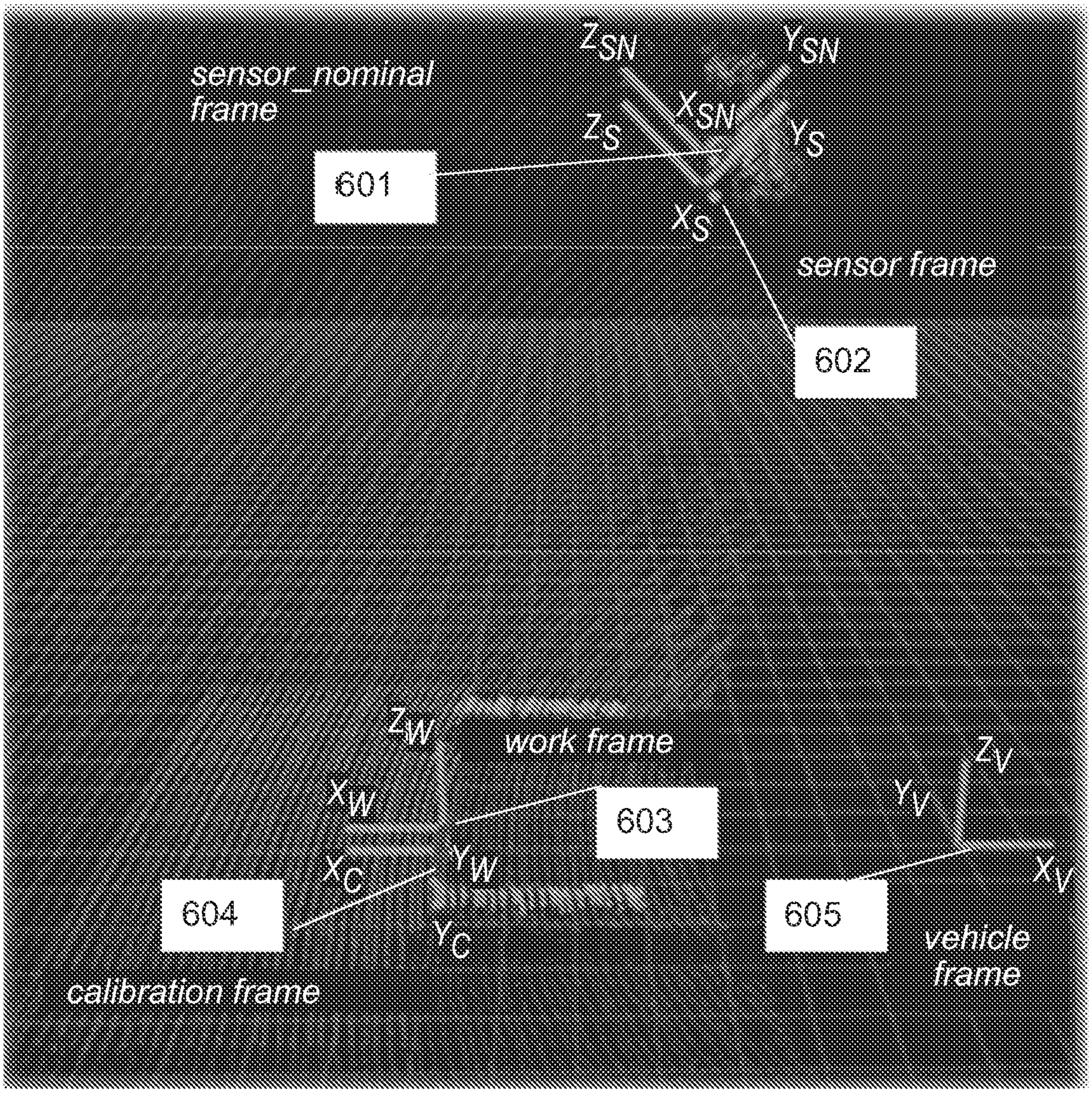
FIGS. 6 and 7 are LiDAR images including relevant coordinate frames for performing an extrinsic calibration operation on the vehicle-mounted sensor of FIGS. 4 and 5.
Figure 7:
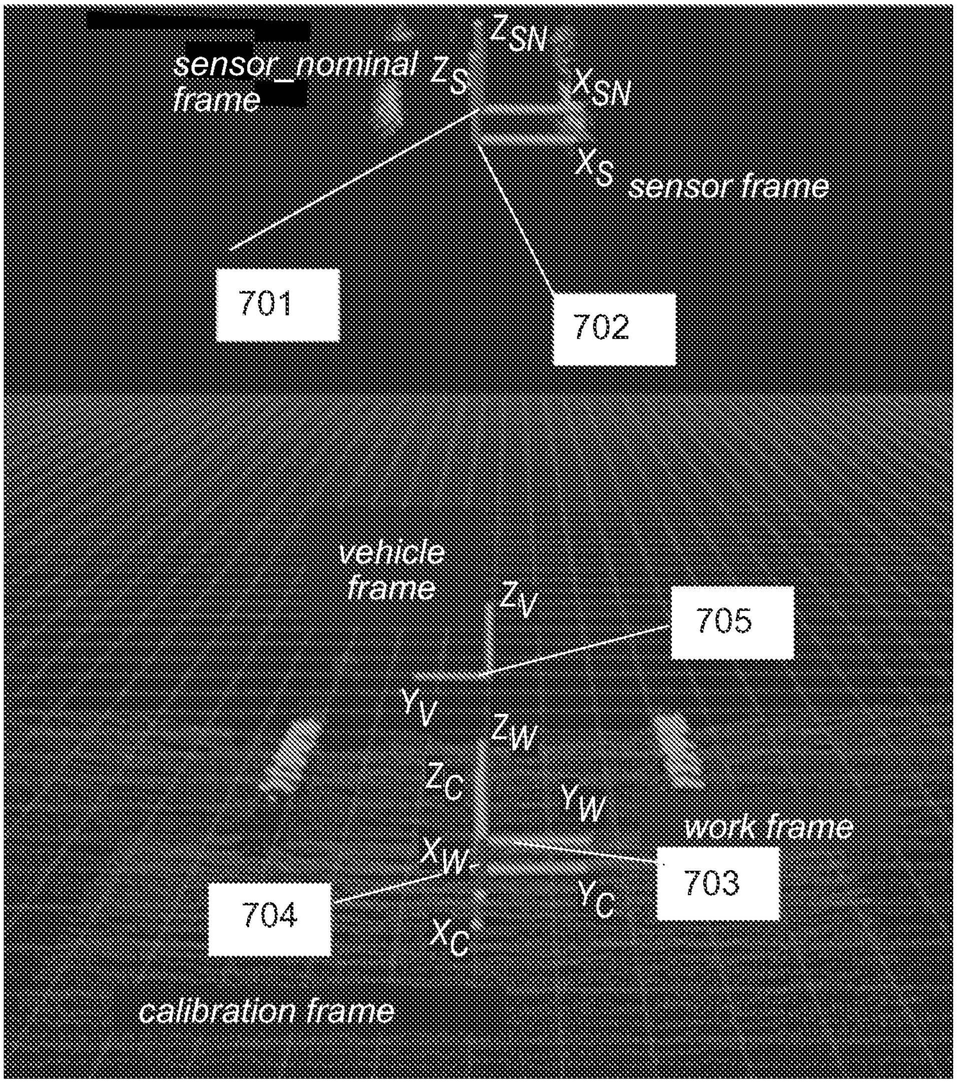

FIGS. 6 and 7 are LiDAR images 600, 700, respectively, including relevant coordinate frames for performing an extrinsic calibration operation on a vehicle-mounted sensor 150 of FIGS. 4 and 5. The following describes FIG. 6, although FIG. 7 can equally apply since FIG. 7 is similar to FIG. 6 except for the position and orientation of the vehicle 100. For example, the various coordinate frames 701-705 of FIG. 7 are similar to frames 601-605 of FIG. 6 so details of FIG. 7 are not repeated for brevity.

As an initial matter, in FIGS. 6 and 7 illustrate the sensor 150 relative to the vehicle frame at a correct position, which for example is under the drive wheel of the vehicle but not limited there to. The inaccuracies are due to the generated in engineering designs providing a desired location of the sensor but in fact the sensor is positioned at a slightly different location during manufacturing, and not exactly according to the drawings since it is well-known that finished products are not produced exactly according to the original specifications. As described below, here an initial sensor coordinate frame or sensor nominal is offset relative to sensor 150.

A calibration process, for example, the method 300 of FIG. 3, can be performed to recover the actual position and orientation of the sensor 150 in the vehicle frame. In doing so, the calibration module 180 can solve for a change in position and orientation, or a transform, between the location of the sensor according to the engineering drawing estimates and where the physical sensor 150 is in fact located. The calibration module 180 is required to address the error between the actual position and orientation of the sensor, and the position and orientation of the sensor of the design drawings. The calibration must also be robust to noise and errors in the sensor measurements themselves that are being used to solve for the transform. For example, if two different scans are produced by the sensor 150, then two different point clouds are generated, namely, similar point clouds but with different points due to sensor noise and measurement outliers due to errors in range measurements.

To compensate for this, potentially many redundant measurements (point clouds) are generated. With each one, the calibration module 180 segments the features and estimates the calibration comparing where the features are and the system expects them to be. Each of these calibrations is close, but nevertheless different because each incurs errors. Therefore, the calibration estimates are fused together using both continuous and robust optimization techniques to generate a final calibration that minimizes the disagreement (errors) between all the calibrations. Each calibration incurs errors because they are estimated from segmenting features, and every time a feature is segmented, the calibration module 180 attempts to minimize errors because the point cloud data have errors in them. Redundant measurements (points) are provided to compensate for this.

For example, the calibration module 180 can estimate the yaw of the sensor 150 from the orientation of the truck's outriggers 108 that are segmented. Two points are necessary to form a line between them, but these points may have noise that causes errors and therefore, an inaccurate line may be generated. The calibration module 180 processes a plurality (e.g., hundreds) of points from the outriggers 108 to estimate that line and applies one or more robust optimization techniques to generate a line that minimizes the errors for all the points. In some embodiments, other natural features may be used, such as the floor. The floor may be modeled as a plane, i.e., where z=0. However, this is inaccurate because the floor is not perfectly flat. Therefore, instead of generating 3 points to model a plane, a plurality (e.g., thousands) of points are produced and robust optimization techniques are applied to determine a plane model that minimizes the disagreement (error) across all these points.

More specifically, the floor is segmented by the calibration module 180 from the point cloud and fit it to a plane model. To address the fact that the floor is not perfectly level, the calibration module 180 solves for a change in the pitch and roll of the LiDAR sensor so that the transformed point set would be as close to flat/level as possible. The height of this plane above the ground also gives an estimate for the z-translation. For example, if the nominal calibration implies the LiDAR is 1.0 meters above the ground, but the floor or plane being segmented is 1.0156 meters above the ground, the calibration module can apply an algorithm, e.g., described herein, to correct the z-translation of the LiDAR sensor.

In another example, the location and orientation of the outriggers 108 is assumed to be correct. Although this may not be true, the work frame 603 of FIG. 6 or work frame 703 of FIG. 7 is relative to the outriggers 108 so this assumption can be made. In the generated point cloud, the outriggers 108 are expected to be parallel to the x-axis, and the engineering drawings for designing the vehicle may reflect this. In reality, the outriggers are not perfectly parallel to the x-axis in the work frame. This error may be attributed by the LiDAR calibration. The generated point cloud corresponding to the outriggers may include points establishing misalignment because the sensor 150 is in fact at a different location than specified, and in particular, is not exactly centered between the outriggers. The work frame origin, however, is dead center between the tips of the outriggers 108 and the x-axis is aligned with the orientation of the outriggers. The calibration module 180 can solve for the yaw to generate transforms so that the outriggers 108 are parallel to the x-axis. The calibration module 180 can generate a transform with respect to the differences between the temporary calibration frame and the work frame. In addition, the calibration module 180 can generate a transform with respect to the differences between the sensor nominal frame 601 and the sensor frame 602.

For example, the outrigger tips may be expected to be at 0.0 meters in the x-direction in the work frame. If they were at 0.0437 meters, the calibration module 180 can correct the x-translation of the LiDAR sensor 150. The calibration module 180 can also solve for the y-translation. As previously mentioned, it is expected that the LiDAR is mounted exactly centered between the two outriggers 108.

Referring again to FIGS. 6 and 7, in various embodiments, the initial sensor coordinate frame can be referred to as sensor nominal frame 601, shown by coordinate system ($x_{sn}$, $y_{sn}$, $z_{sn}$). The name is indicative of the sensor 150 having only a nominal calibration (e.g., from CAD measurements) that is incorrect. Three other coordinate frames are required to determine the "real" or actual sensor frame 602.

The first other coordinate frame (coordinate system $x_s$, $y_s$, $z_s$) is the sensor frame 602 which is connected to the sensor nominal frame 601. The transform between these two frames which is written as sensor_nominal→sensor can correct the nominal calibration, and this is what is solved for. This can be determined indirectly.

The second other required coordinate frame is the work frame 503 (coordinate system $x_w$, $y_w$, $z_w$) which is another vehicle frame and observable from the sensor measurements.

The third other required coordinate frame is the calibration frame 504 (coordinate system $x_c$, $y_c$, $z_c$) which is a temporary, virtual frame.

The transform from sensor_nominal (601)→sensor (602) cannot be determined directly. Instead, the transform from work (603)→calibration (604) is determined which removes the error between the expected and actual vehicle feature poses that the sensor observes.

Once the work→calibration transform has been recovered, the problem to be determined is:

$$\text{calibration (604)} \rightarrow \text{work (603)} \rightarrow \ldots \rightarrow \text{sensor\_nominal(601)} = \text{work (603)} \rightarrow \ldots \rightarrow \text{sensor\_nominal(601)} \rightarrow \text{sensor (602)},$$

where the ellipsis ( . . . ) represents any number of intermediate transforms that may exist between the initial and final frames. In other words, it is desired to "transform" the correction that was determined in the calibration (604) →work (603) transform to the sensor_nominal (601)→sensor (602) transform.

This reduces to the similarity transform:

$$\text{sensor\_niminal(601)} \rightarrow \text{sensor (602)} = A^{-1} * \text{calibration (604)} \rightarrow \text{work (603)} * A,$$

where A=work→ . . . →sensor_nominal, and where * is the transform composition operator which is matrix multiplication when the transforms are represented as homogeneous transformation matrices.

Since it is assumed that the transform A is known a priori, the problem is to determine the calibration (604)→work (603) transform. This requires (1) identifying features of the vehicle to be used for calibration, and (2) automatically segmenting those features with a high enough degree of accuracy to replace a purpose-built calibration target.

Useful features are those that allow for each of the 6-DOF (degree of freedom) calibration parameters to be estimated. In an AMR lift truck instance, an Ouster OSO 3D LiDAR sensor 150 is calibrated using the vehicle's outriggers 108, as illustrated in FIG. 5, FIGS. 5-7 are perspective views of an AMR forklift 100 having a vehicle-mounted sensor 150 that can be configured to provide extrinsic calibration of the vehicle-mounted sensor using natural vehicle features 190, for example, the outriggers 108 of FIG. 1, in accordance with aspects of the inventive concepts.

The controller 110 or processor 106 shown in FIG. 1 may be used to communicate with sensors 150, 154, 156, and which communicate with the calibration module 180.

In order to solve for inconsistencies between expected and measured vehicle feature poses, additional proprioceptive data (e.g., encoder measurements) from the vehicle may be fused with the sensor measurements. Such an approach was demonstrated for the robotic vehicle calibration, as seen in FIGS. 6 and 7. Accordingly, in some examples, each of a plurality of scans can provide a calibration, and the multiple calibrations can be fused. In another example, a single calibration can be performed with respect to a plurality of aggregated scans.

Although a robotic vehicle is described, the present inventive concept may be applied to any field that uses sensors mounted on a body, that desire to know the sensor's relative pose with respect to that body and can observe some salient body features to support the calibration.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A robotic vehicle, comprising:

at least one processor in communication with at least one computer memory device;

at least one vehicle-mounted sensor configured to acquire measurement data of at least one natural feature of the robotic vehicle; and an extrinsic calibration system comprising computer program code executable by the at least one processor to register the measurement data to a common coordinate frame to perform an extrinsic calibration of the at least one sensor, wherein the at least one natural feature is part of the robotic vehicle and used as a reference for calibration by the extrinsic calibration system independently of external environmental features, wherein the at least one natural feature is an outrigger rigid and fixed to the robotic vehicle and within a line-of-sight of the at least one sensor, and wherein a location and an orientation of the outrigger are assumed to be correct.

2. The robotic vehicle of claim 1, wherein the measurement data includes point cloud data.

3. The robotic vehicle of claim 2, wherein the at least one processor is configured to perform the extrinsic calibration of the at least one sensor based on the point cloud data.

4. The robotic vehicle of claim 1, wherein the at least one sensor comprises at least one of a LiDAR scanner and a 3D camera.

5. The robotic vehicle of claim 1, wherein the at least one sensor comprises a static sensor and the extrinsic calibration is provided based on a single measurement or multiple measurements from the static sensor.

6. The robotic vehicle of claim 1, wherein the at least one sensor comprises an actuated sensor and the extrinsic calibration is provided based on multiple measurements from the actuated sensor.

7. The robotic vehicle of claim 1, wherein the outrigger further comprise a color providing a reflective surface for receiving a source of laser light that illuminates the outrigger, and wherein the at least one sensor measures a reflection of the laser light received from the outrigger.

8. The robotic vehicle of claim 1, wherein the extrinsic calibration system segments a 3D model of the at least one natural feature from the at least one sensor to a point cloud and corrects a translation and rotation of the 3D model of the at least one natural structural feature with a point set of the point cloud.

9. The robotic vehicle of claim 1, wherein the extrinsic calibration system recovers an actual position and orientation of the at least one sensor in a vehicle frame.

10. The robotic vehicle of claim 9, wherein the extrinsic calibration system corrects a nominal calibration of the at least one sensor by generating a first transform between a work frame and a calibration frame and a second transform between the initial sensor coordinate frame and a sensor frame.

11. The robotic vehicle of claim 1, wherein the extrinsic calibration system is configured to perform calibration in real-time during operation of the robotic vehicle.

12. A method of providing an extrinsic calibration of a sensor of a robotic vehicle, comprising:

at least one vehicle-mounted sensor acquiring measurement data of at least one natural feature of the robotic vehicle; and an extrinsic calibration system processing the measurement data, including registering the measurement data to a local coordinate frame of the vehicle to perform an extrinsic calibration of the at least one sensor, wherein the at least one natural feature is part of the robotic vehicle and used as a reference for calibration by the extrinsic calibration system independently of external environmental feature wherein the at least one natural feature is an outrigger rigid and fixed to the robotic vehicle and within a line-of-sight of the at least one sensor, and wherein a location and an orientation of the outrigger are assumed to be correct.

13. The method of claim 12, wherein the measurement data includes point cloud data.

14. The method of claim 13, wherein performing the extrinsic calibration of the at least one sensor is based at least in part on the point cloud data.

15. The method of claim 13, wherein the performing extrinsic calibration comprises:

acquiring the point cloud data from the at least one sensor;

detecting natural features of the robotic vehicle;

automatically estimating the relative position and orientation of the natural features from the sensor measurements;

mapping the relative position and orientation of the natural features to errors in sensor calibration; and determining the extrinsic calibration that minimizes the errors.

16. The method of claim 12, wherein the at least one sensor comprises a static sensor and the extrinsic calibration is based on a single measurement or multiple measurements from the static sensor.

17. The method of claim 12, wherein the at least one sensor comprises an actuated sensor and the extrinsic calibration is based on multiple measurements from the actuated sensor.

18. The method of claim 12, further comprising performing extrinsic calibration of the at least one sensor at regular intervals, or when certain program states are entered.

19. The method of claim 12, wherein the extrinsic calibration system recovers an actual position and orientation of the at least one sensor in a vehicle frame.

20. The method of claim 12, wherein the extrinsic calibration system corrects a nominal calibration of the at least one sensor by generating a first transform between a work frame and a calibration frame and a second transform between the initial sensor coordinate frame and a sensor frame.

21. A robotic vehicle, comprising:

at least one processor in communication with at least one computer memory device;

at least one vehicle-mounted sensor configured to acquire measurement data of at least one natural feature of the robotic vehicle; and an extrinsic calibration system comprising computer program code executable by the at least one processor to:

register the measurement data to a local coordinate frame of the vehicle to perform an extrinsic calibration of the at least one sensor;

segment a 3D model of the at least one natural feature from the at least one sensor to a point cloud; and correct a translation and rotation of the 3D model of the at least one natural feature with a point set of the point cloud, wherein the natural feature is part of the robotic vehicle and used as a reference for calibration by the extrinsic calibration system independently of external environmental features wherein the at least one natural feature is an outrigger rigid and fixed to the robotic vehicle and within a line-of-sight of the at least one sensor, and wherein a location and an orientation of the outrigger are assumed to be correct.

* * * * *